Patented Feb. 22, 1938

2,109,432

UNITED STATES PATENT OFFICE 2,109,432

PLASTIC COMPOSITION

Stefan Morgenstern, Berlin-Charlottenburg, and Johann Eggert, Berlin, Germany, assignors to Deutsche Hydrierwerke Aktiengesellschaft, Berlin-Charlottenburg, Germany, a corporation of Germany No Drawing. Application January 31, 1935, Serial No. 4,326. In Germany January 31, 1934

9 Claims. (Cl. 106—38)

This invention relates to useful plastics derived from protein materials and more particularly refers to plasticizers for proteins which comprise higher alcohols or derivatives thereof.

It is known that protein materials such as gelatin, glue, casein, albumins, etc. may be converted to hard masses. Due to the fact that these masses were quite brittle it was customary to incorporate therein glycerin in order to impart softness and elasticity thereto. Glycerin, as is well known, is a strong hygroscopic agent and rapidly removes moisture from the surrounding air. The aforementioned avidity of glycerin for moisture results in a product the characteristics of which vary considerably, depending upon the moisture content of the surrounding air. Moreover, glycerin tends to accelerate putrefaction and decomposition of the protein materials.

In order to overcome the disadvantages of glycerin it was proposed to substitute sulfonated oils and fats therefor. For example, Turkey red oils were incorporated in proteins. However, these oils and fats were quite sensitive to water and decomposed readily, thereby detrimentally affecting the proteins with which they were incorporated.

It is an object of the present invention to plasticize protein materials generally, and materials related thereto. A further object is to determine a class of plasticizers which impart satisfactory softness and elasticity to the resulting plastics, but which do not cause putrefaction or decomposition of the same. A still further object is to determine a class of plasticizers which may conveniently be prepared, is stable, and results in the production of uniform plastics. Additional objects will become apparent from a consideration of the following description and claims.

These objects are attained according to the herein described invention wherein higher alcohols or their derivatives are incorporated in proteins or related materials. In a more limited sense this invention is directed to the incorporation in gelatin, glue, casein, etc. of alcohols containing at least six carbon atoms, and/or their esters and/or ethers. In its preferred embodiment this invention pertains to the use as protein plasticizers of normal primary alcohols containing from twelve to eighteen carbon atoms, their esters and/or ethers.

The invention may be more readily understood by a consideration of the following illustrative examples, in which the quantities are stated in parts by weight:

Example 1

To a gelatin-smelting of the usual composition, 8% oleyl alcohol is embodied in order to increase the pliability. The oleyl alcohol is suitably used in the form of a methyl alcoholic solution. The quantity of the methyl alcohol employed is to be measured in such a way that while adding it to the smelting no noteworthy precipitation of protein results. Instead of the oleyl alcohol, cetyl ricinoleate, dissolved in isopropyl alcohol, in a quantity of about 10% of the total quantity may be used, too. The gelatin products obtained from this smelting are quite elastic, and show great insensitivity to moisture and decomposition.

Example 2

A casein artificial substance of good elasticity is obtained by modifying the customary method for the manufacture of the same by the addition of 5% olein acetate, dissolved in a mixture of equal parts of isopropyl alcohol and butanol. The products obtained can advantageously be formed into the usual articles. Such products are especially distinguished by a good stability and resistance to external influences. Instead of the olein acetate solution, one can also use 10% of a solution of fatty alcohols of high molecular weight, e. g., cetyl alcohol and octadecyl alcohol and/or cetyl ricinoleate. This wax-like mixture is suitably converted into a watery emulsion by means of fatty alcohol sulfonate, before use, and used in that form.

Example 3

A covering-mass such as may be used for the manufacture of sheets for duplicating-machines based on gelatin, is obtainable according to the following combination:

| | Parts by weight |
|---|---|
| 12% aqueous gelatin-solution | 23,5 |
| Mixture of cetyl alcohol and octadecyl alcohol | 6 |
| Oleyl-mono-glycol-ether | 7,5 |
| Octyl-mono-glycerol-ether | 2 |
| 2.2 - methyl-pentamethylene- 4 -oxymethyl-dyhydro-dioxol | 2 |
| Red clay | 3 |
| Water | 12 |

The thus obtained mass is laid in the usual manner upon a suitable bearer such as Japon-silk-paper.

Protein materials and compounds related thereto are exceedingly varied, but since they are well known no attempt will be made herein to describe them in detail. For purposes of illustration it may be stated that materials such as gelatin, glue, casein, albumines, etc. are particularly adapted for the uses of the present invention. In admixture with said materials other well known plastics may be incorporated, for example, cellulose esters and ethers, polymerized vinyl compounds such as esters of the acrylic acid series and their derivatives, etc. The manner of incorporating plasticizers and other well known materials in the aforementioned and related plastics is a matter of common knowledge. For the sake of brevity it may be stated that the prior art methods of molding and otherwise processing proteins and related plastics are suitable for use herein when modified in accordance with the following instructions.

The plasticizers which have been found to be particularly effective are those which contain a hydrocarbon radical of at least six carbon atoms. In particular, it has been found that higher alcohols, their esters and ethers, are surprisingly well suited for use herein. These alcohols may be of open chain or closed chain character, for instance, alcohols of the aliphatic, hydrocyclic and/or aralkl series. Likewise, such alcohols may be saturated or unsaturated and may contain one or more hydroxyl groups. A few of the many alcohols which come within this category are, hexyl, octyl, decyl, lauryl, myristyl, cetyl, stearyl, oleyl, ricinoleyl, linoleyl, cyclohexanol, and benzyl alcohols, alcohols obtained by the reduction of naphthenic acid, etc. These alcohols may conveniently be obtained by the reduction of naturally occurring oils, fats and waxes such as coconut oil, palm kernel oil, herring oil, wool fat, Montan wax, carnauba wax, and the like. In place of individual alcohols mixtures of two or more may be used. Since alcohols obtained by catalytic hydrogenation or saponification of various oils, fats and waxes ordinarily comprise several of the aforementioned and related alcohols it is to be understood that such mixtures are well qualified for inclusion herein.

The aforementioned alcohols may be used as such or they may be converted to their esters and/or ethers. Esterification and etherification reactions are matters of common knowledge and need not be described in detail herein. Suffice it to say that the aforementioned or related alcohols may be treated with fatty acids of the same or a different number of carbon atoms than said alcohols. As in the case of the alcohols, the fatty acids may be open chain or closed chain, and may contain one or more carboxyl groups. A few of the acids which come within this category are butyric, caprylic, caproic, capric, lauric, myristic, palmitic, stearic, oleic, ricinoleic, linoleic, adipic, tartaric, phthalic, succinic, and the like. In the case of ethers, they may be formed by etherifying the aforementioned alcohols with one another or with homologues or similar compounds. For instance, the previously described normal primary alcohols may be etherified with glycols, polyglycols, glycerols, polyglycerols, propyl, butyl, hexyl, octyl, decyl, lauryl, myristyl, cetyl, stearyl, oleyl, ricinoleyl, linoleyl, etc. alcohols.

In accordance with this invention, it is contemplated that one or more of the plasticizers supra may be incorporated in the material to be plasticized either alone or in admixture with prior art plasticizers, fillers, pigments, assistants and related materials well known to one familiar with the plastic art. The particular means of incorporating these materials in the plastic are relatively unimportant. However, very satisfactory results have been obtained by forming an emulsion of the plasticizer and incorporating said emulsion with the material to be plasticized. In producing this emulsion it is ordinarily desirable to have present certain emulsifying agents such as water-soluble salts of sulfuric acid esters of higher fatty alcohols, alkylated naphthalene sulfonic acids and related materials. Moreover, these plasticizers may be dissolved in organic solvents such as mono- or polyhydric lower alcohols, and worked into the plastic material. The material is then, as previously mentioned, worked up, molded, etc. in accordance with known methods.

By means of the present invention proteins and similar materials are converted to plastics possessing a high degree of flexibility and stability. These plastics are exceptionally uniform and durable and may be used for numerous purposes. The plasticizers are readily obtained and may be modified in accordance with the instructions of the present invention within wide limits. These plastics are particularly suitable for use in forming carbon papers, typewriter ribbons, stencil sheets, copying plates or sheets for duplicating machines, waterproof finishes for leather, artificial leather, etc.

As many apparently widely different embodiments of this invention may be made without departing from the spirit and scope thereof, it is to be understood that the invention is not limited to the specific embodiments thereof except as defined in the appended claims.

We claim:

1. A protein-containing material having incorporated therein as a plasticizer for said protein-containing material, a normal primary alcohol containing from twelve to eighteen carbon atoms.

2. A gelatin-containing material having incorporated therein as a plasticizer for said gelatin-containing material a normal primary alcohol containing from twelve to eighteen carbon atoms.

3. A casein-containing material having incorporated therein as a plasticizer for said casein-containing material a normal primary alcohol containing from twelve to eighteen carbon atoms.

4. A protein-containing material having incorporated therein as a plasticizer for said protein-containing material a member selected from the group consisting of normal primary aliphatic alcohols containing from twelve to eighteen carbon atoms, carboxylic acid esters derived from said alcohols, and ethers derived from said alcohols.

5. A protein-containing material having incorporated therein as a plasticizer for said proten-containing material a normal primary aliphatic alcohol containing from twelve to eighteen carbon atoms.

6. A gelatin-containing material having incorporated therein as a plasticizer for said gelatin-containing material oleyl alcohol.

7. A protein-containing material having incorporated therein as a plasticizer for said protein-containing material a mixture of cetyl alcohol and octadecyl alcohol.

8. A casein-containing material having incorporated therein as a plasticizer for said casein-containing material a mixture of cetyl alcohol and octadecyl alcohol.

9. A gelatin-containing material having incorporated therein as a plasticizer for said gelatin-containing material a mixture of cetyl alcohol and octadecyl alcohol.

JOHANN EGGERT.
STEFAN MORGENSTERN.